United States Patent Office 3,647,739
Patented Mar. 7, 1972

3,647,739
STABILIZED CONJUGATED DIENE RUBBER POLYMERS
Edward Leo Kay, Akron, and Jerry Donald Hunt, Cuyahoga Falls, Ohio, and Robert Paul Spitz, West Lafayette, Ind., assignors to The Firestone Tire & Rubber Company, Akron, Ohio
No Drawing. Filed June 4, 1970, Ser. No. 43,573
Int. Cl. C08d 9/00, 11/04
U.S. Cl. 260—33.6 UA     5 Claims

ABSTRACT OF THE DISCLOSURE

Unvulcanized rubbery interconnected polymers are stabilized with a tetra-aryl titanate or a complex thereof with N-alkyl-alkanediamines.

This invention relates to stabilizers for rubbery stereo-regular homopolymers of conjugated hydrocarbon dienes of 4 to 6 carbon atoms, copolymers thereof, and more particularly the rubbery copolymer of butadiene and styrene, and especially the unvulcanized, oil-diluted interconnected (or jumped) polymers.

The term "polymer" is used herein to include homopolymers and copolymers.

The stabilizers of this invention are tetra-aryl titanates and complexes thereof with N-alkyl-alkanediamines.

From 0.005 to 5 phr. (parts per 100 parts of polymer), and generally from about 0.1 to 2 phr. will be used. Less may be used when the stabilizer is mixed with another stabilizer.

Unvulcanized interconnected rubbery polymers are those in which the viscosity and molecular weight have been jumped or otherwise substantially increased by reaction of the initially produced linear polymer with a suitable reagent to increase the molecular weight and at the same time the branching of the polymer. One type of such reaction is exemplified by the reaction of silicon tetrachloride with a live polybutadiene produced by polymerization of butadiene in a non-aqueous system by means of a lithium-based catalyst (e.g., butyllithium or tetramethylene dilithium), the interconnected polymer containing a silicon atom in the center with four hydrocarbon polymer fragments extending therefrom to form a "star." Another type of such interconnecting reaction, termed "jumping," is exemplified by the procedure described by E. F. Engel et al., Rubber Age, December 1964, pages 410–415; any unsaturated rubbery polymer can be jumped by treatment with a two-part catalyst consisting of a Friedel-Crafts catalyst plus a cocatalyst, such as titanium tetrachloride and thionylchloride or ethyl-aluminum sesquichloride and water.

Another type of molecular-weight-increasing-reaction, or interconnecting (jumping) reaction, is exemplified by the reaction of an olefinically unsaturated rubbery polymer with a halogenated organic compound (e.g. ethylene dichloride) in the presence of a strong base (e.g. butyllithium) to produce a mixture of higher molecular weight rubbery polymers of branched construction, and, typically, exemplified by a mixture of polymers having a molecular weight distribution including the original molecular weight of the unreacted rubbery polymer to molecular weights of dimers, trimers, tetramers and higher polymers of the original rubbery polymer. All of these polymers of increased molecular weight contemplated by the invention have improved ability to accept diluting oil and possess good milling and extruding properties ("processing" properties) when extended with oil. From 10 to 100 parts of processing oil, or thereabout may be added to 100 parts of the polymer.

Difficulty has been experienced in stabilizing many oil-diluted rubbery polymers. The stabilizer of this invention provides excellent stabilization of unvulcanized oil-diluted interconnected rubbery polymers, i.e. an unvulcanized linear rubbery polymer which has been interconnected and oil diluted. The invention finds widest use in the stabilization of such copolymers of butadiene and styrene but is useful with other interconnected, oil-extended rubbery polymers, and particularly those derived from the polybutadienes, polyisoprenes and butadiene-isoprene copolymers of any stereo composition. Polymers suitable for use in the interconnecting reaction can be conveniently made by the methods of U.S. Pat. 3,317,918, for example.

Any of the oils commonly used in the dilution of rubbers can be employed, including particularly higher boiling petroleum fractions such as the commercially known naphthenic and aromatic mineral oils. In the dilution of rubbers with oils, about 37.5 parts of oil are customarily used with 100 parts of polymer, although the amount of oil can vary from 10 to 100 parts, more or less. The oil preferably is added to the polymer after the polymerization and interconnecting reactions are completed. The stabilizer can be added prior to the addition of the oil, it can be added with the oil, or it can be added soon thereafter.

The stabilizer is incorporated into the polymer in the usual manner. The stabilizing effect is recognized by the lessening of the decrease in the viscosity of the polymer on heat aging. The stabilizers are added to protect the polymer during drying, storage and processing. The vulcanizates are useful wherever rubber vulcanizates have been employed, as in the manufacture of tires, hose, and a wide variety of products.

The stabilizer is a tetra-aryl titanate or a complex thereof. The titanates include:

tetra m-, o- and p-chlorophenyltitanates
tetra alpha- and beta-naphthyltitanates
tetra o- and p-alkylphenyltitanates in which the alkyl group contains one to three carbon atoms, e.g. tetra-tolyltitanates
tetra alpha- and beta-alkylnaphthalates in which the alkyl group contains one to three carbon atoms.

The complexes are formed with N-alkyl-alkanediamines in which each alkyl group may be straight chain or branched chain and contains 1 to substantially 10 carbon atoms, and the alkyl groups may be the same or different; and the alkane group may be straight chain or branched chain and contains 2 to substantially 6 carbon atoms. The amine group may be at any location along the chain. The amine complexes formed with N-coco 1,3-propane diamine (known commercially as Duomeen C) are preferred. The complexes are formed from equivalent weights of the titanate and diamine.

The Duomeen C complex of any of the foregoing titanates effects stabilization of an unvulcanized interconnected rubbery polymer derived from a linear homopolymer of a conjugated diene containing 4 or 5 carbon atoms or a copolymer thereof, or a copolymer thereof with styrene or alpha-methyl styrene, particularly when extended with oil.

The titanates may be made by the following procedure which illustrates specifically the preparation of tetraphenyl titanate.

The addition of 27 grams of tetrabutyl titanate to 30 grams of phenol in a moisture-free flask produced a deep red mixture. After the addition of 10 parts of sodium-dried toluene, the solution was refluxed overnight, and the toluene was removed by distilling at atmospheric pressure (103–120° C.). The residue was a hard, dark red solid. It was dissolved in toluene and precipitated by the addition of petroleum ether. The reddish-orange precipitate was filtered from the solvent. The yield was 29 grams of product.

The following describes the preparation of the complex and is illustrative of the preparation of complexes from the various tetra-aryl titanates.

Equimolar quantities of tetraphenyl titanate and Duomeen C were each dissolved in small portions of dichloromethane. As the two solutions were mixed, the temperature of the mixture rose from 25° to 34° C. The mixture was stirred for a few minutes and then the solvent was evaporated, leaving a viscous red liquid.

The polymer used in the tests recorded in the following table was prepared by reaction of $SiCl_4$ with live butadienestyrene copolymer obtained through continuous non-aqueous polymerization utilizing butyllithium as a catalyst. A polymer cement-oil masterbatch was prepared containing 37.5 parts of processing oil per 100 parts of polymer, and the stabilizers of this invention were added to portions of the masterbatch to produce the samples for aging studies.

These masterbatch samples were desolventized in a stirred batch-type water desolventization tank at a temperature between 65° C. and the boiling point of the solvent. The crumb samples thus obtained were then dried in an oven for three hours at 150° F. and then overnight at room temperature.

Each dried polymer masterbatch sample was milled to achieve homogeneity and samples of the appropriate size were cut from each of the milled polymers. A Mooney viscosity (ML-4-212° F.) determination was made on each sample prior to aging. Samples containing the various stabilizers were then aged in a forced air oven at 75° C. for various periods of time. The results obtained with the different stabilizers of this invention are recorded in the following table.

The data in the table comprise one sample to which no stabilizer was added, another to which commercial stabilizer was added, and additional samples to which the stabilizers of the present invention were added.

TABLE

|  | Percent retention of Mooney viscosity (ML/4/212° F. after aging) | | | |
| --- | --- | --- | --- | --- |
|  | 2 days | 4 days | 6 days | 8 days |
| No stabilizer | 84.2 | 71.5 | 60.5 | 64.0 |
| Commercial stabilizer | 86.0 | 75.5 | 70.5 | 71.5 |
| Stabilizer: | | | | |
| A | 96.0 | 88.8 | 80.5 | 79.6 |
| B | 95.5 | 89.5 | 92.0 | 78.5 |
| C | 100.4 | 96.5 | 96.5 | 95.5 |
| D | 97.8 | 95.5 | 85.4 | 96.5 |

Commercial stabilizer__ 0.5 phr. Santoflex 13 plus 0.5 phr. oleic acid.
Stabilizer:
  A_____ 0.5 phr. tetrakis (p-chlorophenyl)titanate.
  B_____ 0.5 phr. tetra-β-naphthyltitanate.
  C_____ 0.5 phr. tetraphenyltitanate-Duomeen C complex.
  D_____ 0.5 phr. tetrakis (p-chlorophenyl)titanate-Duomeen C complex.

The titanates and their complexes gave better stabilization than the commercial stabilizer.

The stabilized oil-diluted polymers of the invention are useful in practically every instance in which conventional oil-diluted SBR, oil-diluted natural rubber and oil-diluted rubbery polymers have been useful, including, without limitation, use in pneumatic tire treads, sidewalls and carcass stocks. Also the stabilized polymers of the invention can be blended with other known polymers to provide useful commercial compositions for fabrication into useful shapes and articles. The stabilized polymers of the invention are advantageously blended with known rubbers (e.g., natural rubber, polybutadienes, polyisoprenes, butadiene-styrene copolymer, isoprene-isobutylene copolymer, polychloroprene, isoprene-styrene copolymer) with or without additional oils, for forming vulcanizates of great technical importance. The novel stabilized polymers are advantageously mixed with the known reinforcing carbon blacks to produce useful commercial stocks, which also can contain one or more additional rubbery polymers, and also can contain 5 to 100 phr. of additional oil or plasticizer. Sulfur and other known vulcanizing agents for natural rubber and the commerical synthetic rubbers are useful for forming vulcanizable stocks containing the novel stabilized polymer. Known methods of mixing, forming, fabricating and curing or vulcanizing compositions of natural and commercial synthetic rubbers are applicable to and useful with compositions containing the novel stabilized polymers of the invention. The novel polymers are especially useful in pneumatic tire tread, sidewall and carcass compositions, and the considerations of this paragraph are especially relevant to the use of the novel polymers, in tires.

We claim:
1. Oil diluted unvulcanized, interconnected, conjugated-diene rubber polymer of the class consisting of (1) homopolymers and (2) copolymers of a plurality of hydrocarbon conjugated dienes of 4 to 6 carbon atoms and (3) copolymers of such dienes with styrene or methylstyrene, which polymers contain sufficient tetra-aryl-titanate complexed at elevated temperature with a substantially equivalent weight of an N-alkyl-alkanediamine in which each alkyl group contains 1 to substantially 10 carbon atoms and the alkane group contains 2 to substantially 6 carbon atoms to be stabilized thereby.

2. The composition of claim 1 in which the polymer is oil diluted and the tetra-aryl titanate is complexed with a substantially equivalent weight of N-coco-1,3-propanediamine.

3. The composition of claim 2 in which the polymer is a rubber copolymer of butadiene-methylstyrene and is interconnected with silicon.

4. The composition of claim 3 which is stabilized with 0.005 to 5 parts per 100 parts of the polymer of a complex of tetra-beta-naphthyltitanate.

5. The composition of claim 3 which is stabilized with 0.005 to 5 parts per 100 parts of the polymer of tetraphenyltitanate complexed with N-coco-1,3 - propanediamine.

References Cited

UNITED STATES PATENTS

| 2,999,831 | 9/1961 | Stewart | 260—33.6 |
| 3,002,944 | 10/1961 | Kraus et al. | 260—23.7 |
| 3,281,383 | 10/1966 | Zelinski et al. | 260—23.7 |
| 3,329,645 | 7/1967 | Childers | 260—33.6 |
| 3,418,348 | 12/1968 | Shepard et al. | 260—45.75 |

DONALD E. CZAJA, Primary Examiner

V. P. HOKE, Assistant Examiner

U.S. Cl. X.R.

260—45.75 R